(12) United States Patent
Pierce et al.

(10) Patent No.: US 12,135,096 B2
(45) Date of Patent: Nov. 5, 2024

(54) PORTABLE VALVE OPERATING DEVICE FOR USE IN EXERCISING VALVES

(71) Applicant: ILLINOIS TOOL WORKS INC., Glenview, IL (US)

(72) Inventors: Kenneth R. Pierce, Arlington Heights, IL (US); Michael W. Gearhart, Schaumburg, IL (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 554 days.

(21) Appl. No.: 17/175,022

(22) Filed: Feb. 12, 2021

(65) Prior Publication Data

US 2021/0254746 A1 Aug. 19, 2021

Related U.S. Application Data

(60) Provisional application No. 62/976,425, filed on Feb. 14, 2020, provisional application No. 62/976,848, (Continued)

(51) Int. Cl.
*F16K 31/04* (2006.01)
*B25B 21/00* (2006.01)
(Continued)

(52) U.S. Cl.
CPC .......... *F16K 31/048* (2013.01); *B25B 21/002* (2013.01); *B25B 23/147* (2013.01); (Continued)

(58) Field of Classification Search
CPC .... F16K 31/04; F16K 31/048; F16K 37/0075; F16K 37/0083; F16H 1/28
See application file for complete search history.

(56) References Cited

U.S. PATENT DOCUMENTS

| 1,979,340 A | 11/1934 | Norman |
| 4,994,001 A | 2/1991 | Wilkinson et al. |

(Continued)

FOREIGN PATENT DOCUMENTS

| DE | 34 12 032 A1 | 12/1984 |
| DE | 20 2012 008347 U1 | 9/2012 |
| EP | 3 275 596 A1 | 1/2018 |

OTHER PUBLICATIONS

International Search Report and Written Opinion for PCT Application No. PCT/US2021/018021 dated Jun. 9, 2021, 15 pages.
(Continued)

*Primary Examiner* — Matthew W Jellett
(74) *Attorney, Agent, or Firm* — Klintworth & Rozenblat IP LLP

(57) ABSTRACT

A valve operating device includes a base having a housing thereon. A motor, a motor controller unit, and a human machine interface controller are disposed in the housing. A display device mounted on top of the housing is controlled by the human interface controller to display control screens and receive user input. The operator controls operation of the device at a home control screen, which displays information regarding the exercise of the valve as it is acquired. Data configuration and storage functions are controlled via a valve data record screen and identifier screens accessible from the home control screen.

23 Claims, 14 Drawing Sheets

Related U.S. Application Data filed on Feb. 14, 2020, provisional application No. 62/976,405, filed on Feb. 14, 2020.

(51) Int. Cl.

| | | |
|---|---|---|
| *B25B 23/147* | (2006.01) | |
| *F16K 37/00* | (2006.01) | |
| *G06F 3/04847* | (2022.01) | |
| *H02K 7/116* | (2006.01) | |
| *H02P 23/24* | (2016.01) | |
| *F16H 1/28* | (2006.01) | |
| *F16H 57/02* | (2012.01) | |

(52) U.S. Cl.
CPC ...... *F16K 37/0075* (2013.01); *F16K 37/0083* (2013.01); *G06F 3/04847* (2013.01); *H02K 7/116* (2013.01); *H02P 23/24* (2016.02); *F16H 1/28* (2013.01); *F16H 57/02* (2013.01); *F16H 2057/02034* (2013.01); *F16H 2057/02073* (2013.01)

(56) References Cited

U.S. PATENT DOCUMENTS

| | | | | |
|---|---|---|---|---|
| 5,339,239 | A * | 8/1994 | Manabe | G06F 16/252 |
| | | | | 235/375 |
| 5,361,996 | A | 11/1994 | Svensson et al. | |
| 5,381,996 | A * | 1/1995 | Arnemann | F16K 31/12 |
| | | | | 251/59 |
| 5,570,581 | A | 11/1996 | Preston | |
| 5,810,051 | A * | 9/1998 | Campagna | E03B 9/00 |
| | | | | 251/59 |
| 6,125,868 | A * | 10/2000 | Murphy | F16K 31/46 |
| | | | | 702/41 |
| 6,282,989 | B1 | 9/2001 | Sorter | |
| 7,334,606 | B1 * | 2/2008 | Hurley | B60R 11/06 |
| | | | | 251/293 |
| 7,415,376 | B1 * | 8/2008 | Hurley | F16K 37/0091 |
| | | | | 702/182 |
| 7,604,023 | B2 * | 10/2009 | Buckner | B60P 3/227 |
| | | | | 137/899.4 |
| 7,703,473 | B1 * | 4/2010 | Hurley | F16K 37/0083 |
| | | | | 248/122.1 |
| 7,886,766 | B2 * | 2/2011 | Radomsky | F16K 37/0083 |
| | | | | 137/554 |
| 8,864,101 | B1 * | 10/2014 | Buckner | E03B 7/08 |
| | | | | 251/59 |
| 9,140,370 | B2 * | 9/2015 | Kannoo | F16K 11/074 |
| 11,326,706 | B2 | 5/2022 | Pierce et al. | |
| 2004/0045414 | A1 | 3/2004 | Reuschel | |
| 2009/0267010 | A1 | 10/2009 | Ferrar | |
| 2012/0138830 | A1 | 6/2012 | Ferrar et al. | |
| 2017/0067575 | A1 | 3/2017 | Preston | |
| 2018/0215019 | A1 | 8/2018 | Hooks | |
| 2020/0230827 | A1 * | 7/2020 | Wozniak | F16K 31/46 |
| 2022/0243838 | A1 * | 8/2022 | Wozniak | F16K 31/047 |

OTHER PUBLICATIONS

International Search Report and Written Opinion for International Patent Application No. PCT/US2021/017764 dated Jun. 25, 2021.
International Search Report and Written Opinion for International Patent Application No. PCT/US2021/017774 dated Aug. 6, 2021.
International Search Report and Written Opinion for International Patent Application No. PCT/US2021/018024 dated Aug. 2, 2021.

* cited by examiner

FIG. 6B

PORTABLE VALVE OPERATING DEVICE FOR USE IN EXERCISING VALVES

PRIORITY CLAIM AND INCORPORATION BY REFERENCE

This application claims the domestic benefit of U.S. Provisional Patent Application Ser. No. 62/976,405, filed on Feb. 14, 2020; U.S. Provisional Patent Application Ser. No. 62/976,425, filed on Feb. 14, 2020 and U.S. Provisional Patent Application Ser. No. 62/976,848, filed on Feb. 14, 2020, the contents of which are incorporated herein in its entirety.

FIELD OF THE INVENTION

The present invention generally relates to exercising valves.

BACKGROUND

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time.

The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve turning machine. Such machines are heavy and awkward and when operated apply a great amount of torque to the key that extends down a shaft to the valve stem for rotating the valve. Accordingly, to aid in the operation of such valve turning machines, it is common to mount such valve turning machines on an arm attached to a vehicle such as, for example, a truck or trailer.

Some valve turning machines have been equipped with data collection capabilities to monitor the state of the valves exercised over time. The data collection involves obtaining operations records during the valve turning and matching the operations records with previously identified valves. The operations records is collected and transferred to a separate computing device for the processing of the data.

Currently available valve exercising devices tend to be difficult and cumbersome to use in the field. The user interface is typically located separate from the machine and an operator is typically required to perform a substantial amount of steps to configure the machine for operation and data transfer.

SUMMARY

The present invention is defined by the following claims, and nothing in this section should be taken as a limitation on those claims.

In one aspect, a portable valve operating device for use in exercising valves is provided.

In one aspect, a portable valve operating device comprises a base defining a central axis extending from a first end thereof to a second end thereof. A housing is disposed on the base, and a motor is disposed within the housing. The motor includes a motor output shaft configured to drive a planetary gearbox disposed within the housing. The planetary gear is configured to rotate a key extending substantially perpendicular to the central axis to engage a valve. A motor controller unit configured to drive the motor is provided. The motor is driven in either a forward or reverse direction at a set motor speed to deliver up to a torque limit. A user interface comprising a motor activation switch and a display device configured to provide a graphical user interface is provided. The graphical user interface comprises screen images including display buttons. A human machine interface controller receives user inputs via the display buttons and the motor activation switch to perform valve exercise functions corresponding to the display buttons. The valve exercise functions include setting a motor speed, setting a torque limit, turning the motor on or off, and storing valve operation data.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 6A to 6D shows examples of display screens displayed during operation of the example valve operating device.

DETAILED DESCRIPTION

Figure 1:
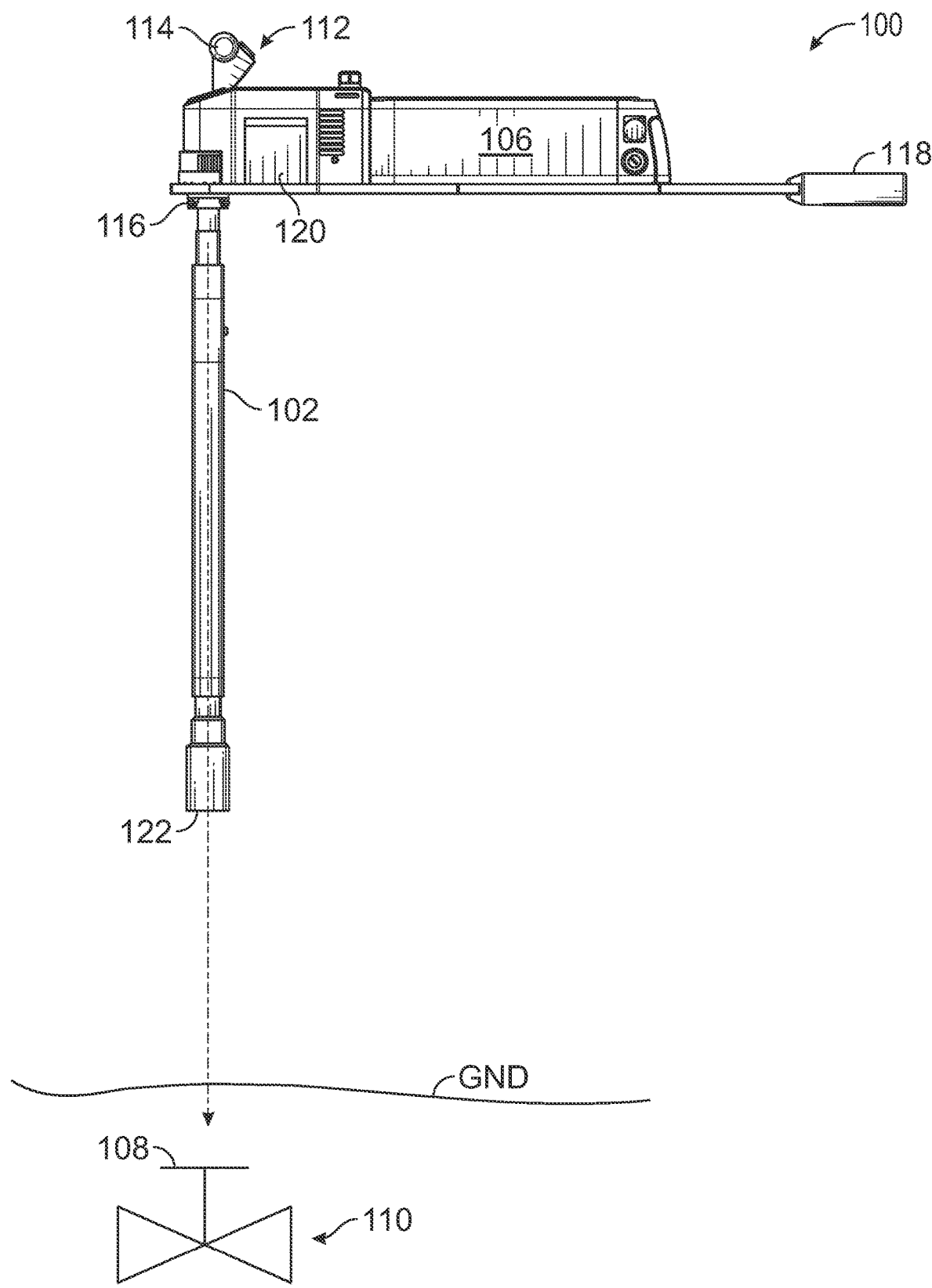
FIG. 1 is a side view of an example implementation of a valve operating device disposed above a valve to be exercised.

FIG. 1 is a side view of an example implementation of a valve operating device 100 disposed above a valve 110 to be exercised. The valve operating device 100 includes a key 102, a battery 106, a first handle 118, a second handle 114, an output socket 116, and a housing 120. The key 102 is configured to removably attach to the output socket 116 on the valve operating device 100. The output socket 116 is configured to mate with a top end of the key 102 such that the key 102 turns when the valve operating device 100 is activated. The key 102 is turned by a motor (described in more detail below with reference to FIG. 3) disposed in the housing 120. A bottom end 122 of the key 102 is configured to engage with a valve opening or closing mechanism 108 on the valve 110. The valve opening or closing mechanism 108 may be a screw that is rotatable through one hundred turns or more to fully open or fully close the valve 110. The valve opening or closing mechanism 108 may include a bolt head shaped protrusion, a bolt head shaped recess, or other suitable forms to enable the key 102 with a bottom end 122 having a compatible shape to turn the valve opening or closing mechanism 108.

In use, an operator holds the valve operating device 100 with the key 102 attached over the valve opening or closing mechanism 108. The operator lowers the valve operating device 100 to engage with the valve opening or closing mechanism 108. The operator then actuates a motor activation switch 112 to turn the key 102, which then turns the valve opening or closing mechanism 108. The operator may switch the motor to turn forward or in reverse through the extent of travel of the valve opening or closing mechanism 108 to fully open and fully close the valve 110. The operator may also use functions available via a graphical user interface on a display device on the housing 120 to select data to store for the valve 110.

Figure 2:
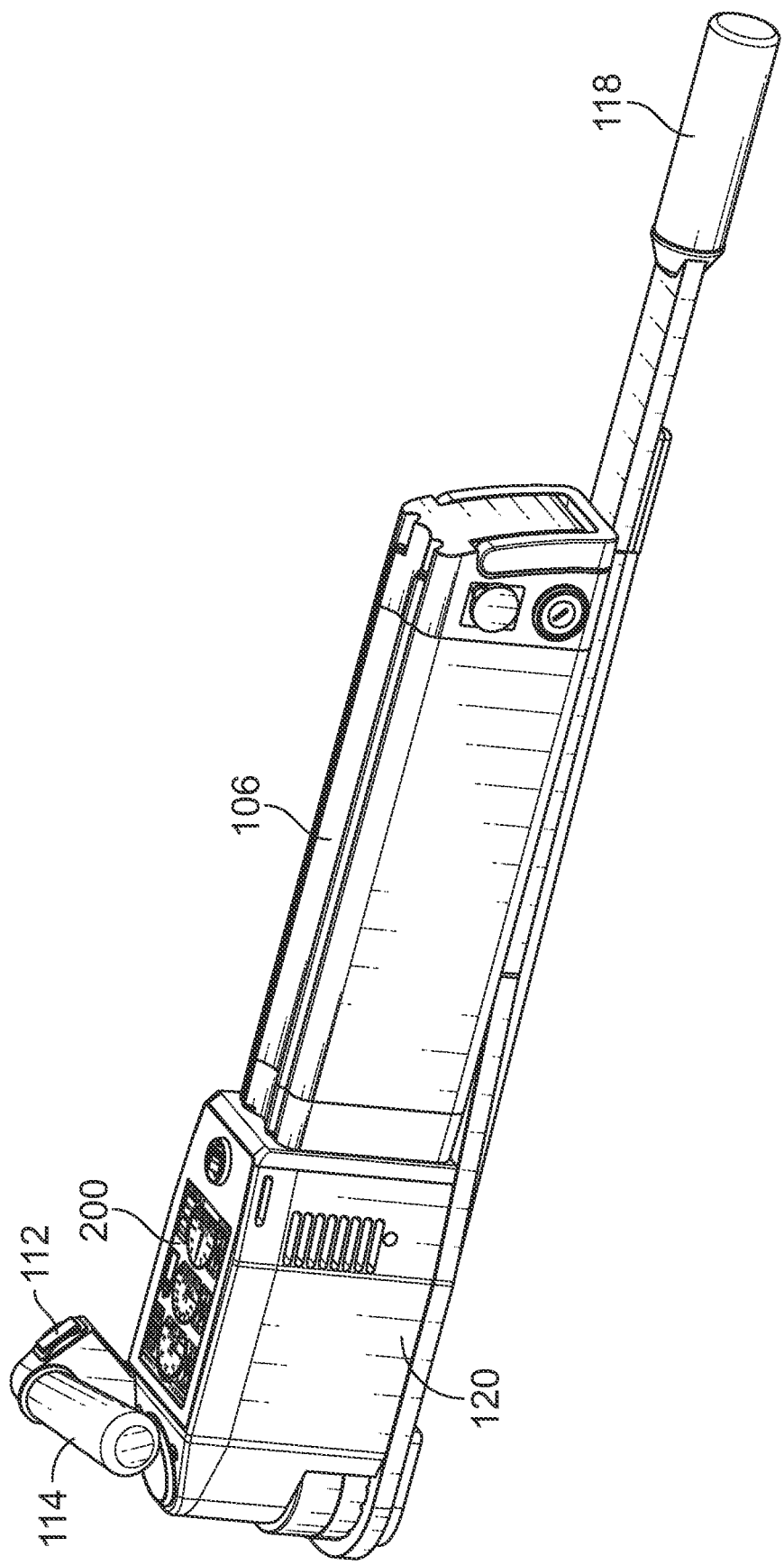
FIG. 2 is an isometric view of the example valve operating device.

FIG. 2 is an isometric view of the example valve operating device 100. The valve operating device 100 in FIG. 2 includes a display device 200 mounted on a top portion of the housing 120. The display device 200 is strategically mounted on the housing 120 proximal to the upwardly extending second handle 114. The second handle 114 is positioned adjacent to the motor activation switch 112 to allow the operator to easily reach the motor activation switch 112 during operation. The proximity of the display device 200, which includes screen buttons to enable actuation of the functions available to the valve operating device 100, to the second handle 114 and the motor activation switch 112 puts the functions of the valve operating device 100 within easy reach during operation.

Figure 3:
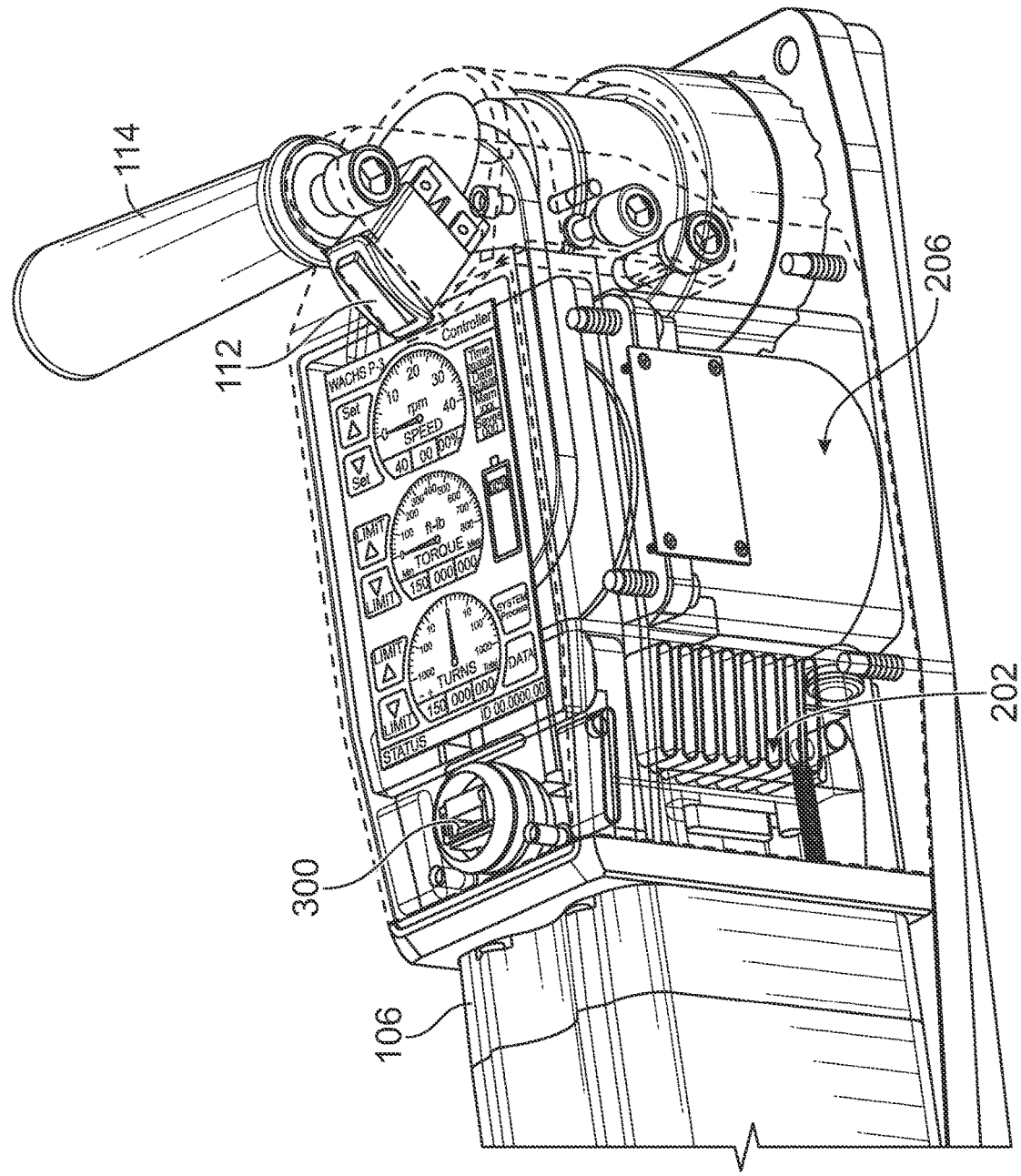
FIG. 3 is a transparent isometric view of a front portion of the example valve operating device.
Figure 4:
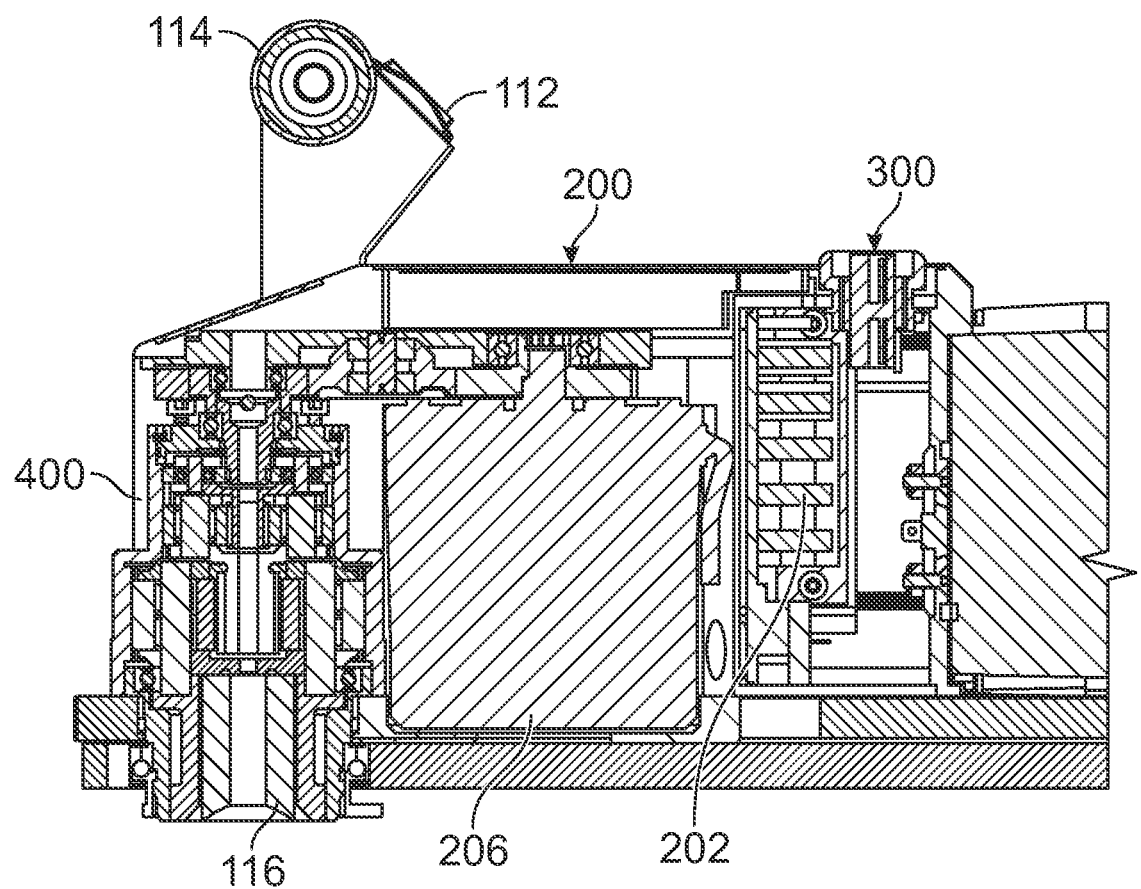
FIG. 4 is a side transparent elevational view of the front portion of the valve operating device.

FIG. 3 is a transparent isometric view of a front portion of the example valve operating device 100. FIG. 4 is a side transparent elevational view of the front portion of the valve operating device. Referring to FIGS. 3 and 4, the display device 200, the motor activation switch 112, and the handle 114 are shown in close proximity to one another at a front portion of the valve operating device 100. A data networking interface 300 is disposed below or behind the display device 200. A motor 206 is enclosed in the housing 120 below the display device 200 and behind a planetary gear module 400. The operator actuates the motor 206 to turn the gear system disposed in the planetary gear module 400. The gears couple to the output socket 116 to turn the key 102 when the key 102 (in FIG. 1) is engaged. Control modules 202 for operating the valve operating device 100 are enclosed in the housing 120 in a space behind the motor 206. In an example implementation, the control modules 202 include a motor controller unit, a human-machine interface controller, and a data networking interface module.

Figure 5:
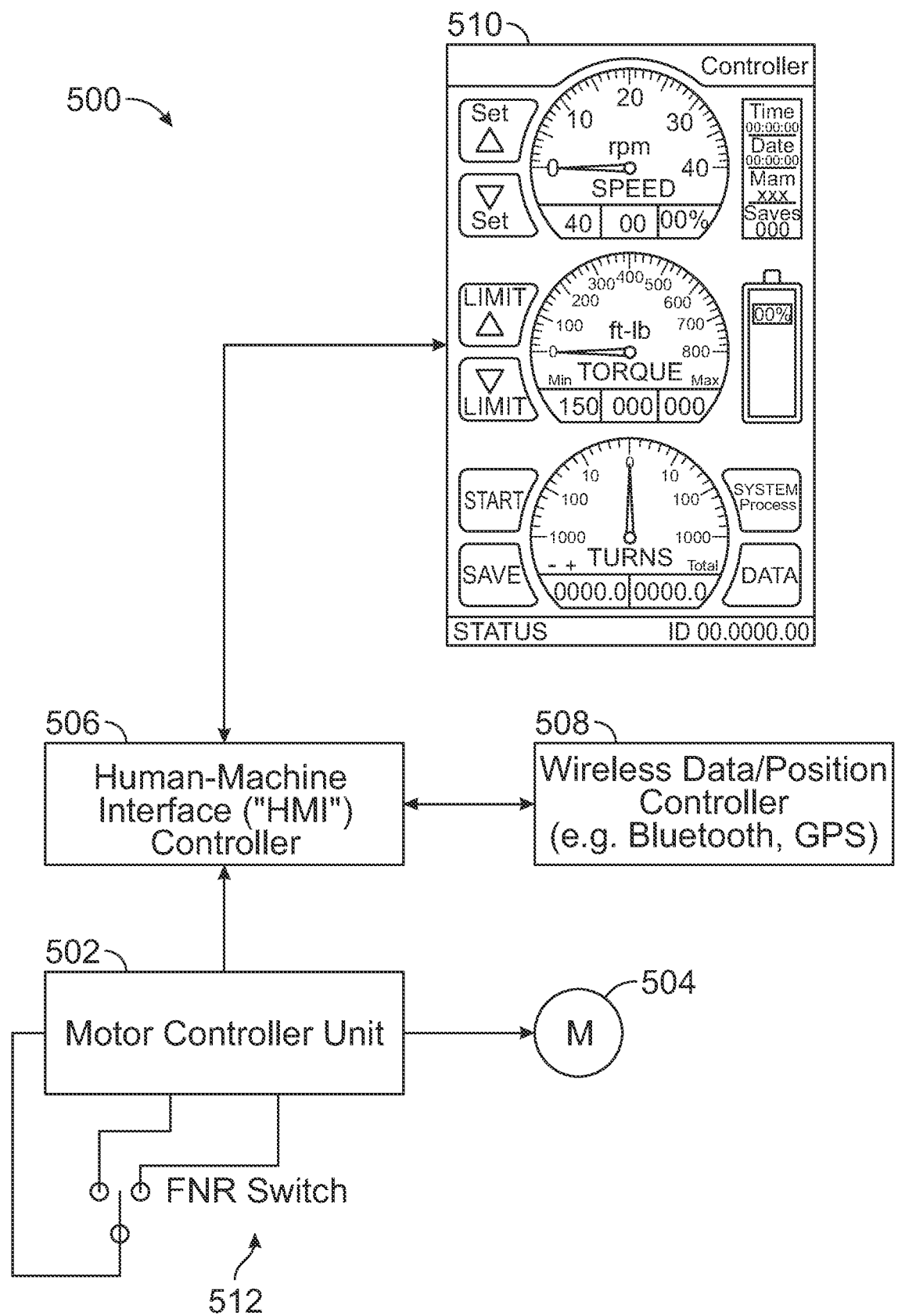
FIG. 5 is a schematic diagram of an example control system for using the example valve operating device.

FIG. 5 is a schematic diagram of an example control system 500 for using the example valve operating device 100. The control system 500 includes a motor controller unit 502, a human-machine interface controller 506, a data networking interface module 508, a display device 510, a motor activation switch (or, Forward-Neutral-Reverse (FNR) switch) 512, and a motor 504.

The motor 504 may be any suitable motor that rotates at high torque sufficient for turning the valves to be exercised in a manner that permits the detection of the motor position and speed. In an example implementation, the motor 504 may be a brushless DC motor. However, any implementation is not limited to any specific motor. Any suitable motor that may be controlled in the manner described may be used.

The motor controller unit 502 may be any suitable controller for controlling the motor 504. The motor controller unit 502 may be provided as a single device, or as multiple devices configured too perform the functions used in operation. In an example implementation, the motor controller unit 502 is configured to drive the motor 504 at a set speed, provide signals or data to determine the speed of the motor 504, provide signals or data to determine the torque of the motor, and receive signals to set a speed, a maximum torque limit, and a direction of travel. In example implementations, the motor controller unit 502 may be implemented using any suitable motor control system that provides control functions such as those described herein. The motor controller unit 502 is not limited to any specific motor controller system, device or scheme.

The human-machine interface controller 506 in FIG. 5 includes a processor, memory for on-device data and program storage, and an input/output system for communicating with the other modules in the system 500. The human-machine interface controller 506 drives the display device 510 to operate as a graphical user interface. The human-machine interface controller 506 includes program functions to provide display screens to the display device 510 and to receive user input from the selection of screen buttons on the display device 510.

The display device 510 may be any suitable LCD or LED display capable of implementation as a graphical user interface. In an example implementation, the display device 510 may be driven to display digital data in alphanumeric form, or images that mimic analog meters. The analog meter images may include an image of a needle against a scale. The display device 510 may then be driven to position the needle against the scale according to a value for which a measure is displayed. Button images may also be displayed to initiate functions as described below with reference to FIGS. 7-9.

The motor activation switch (also referred to as a FNR switch) 512 may be implemented using any suitable three position switch. In an example implementation, the FNR switch 512 is a momentary switch. During operation, the operator presses either the forward or reverse side of the switch and holds the switch to maintain the motion of the motor 504.

It is noted that in the example implementations described in this invention, the forward direction of the motor 504 shall be understood to mean motion of the motor 504 in the right hand, or clockwise direction. The reverse direction shall be understood to mean motion in the left hand, or counter-clockwise direction. The forward direction shall also be understood to mean the direction for closing a valve and the reverse direction shall be understood to mean the opening of the valve. These conventions are not intended as limiting. Some valves may require turning clockwise to open and counter-clockwise to close. These conventions are described solely for purposes of providing clarity to the description.

Figure 6A:
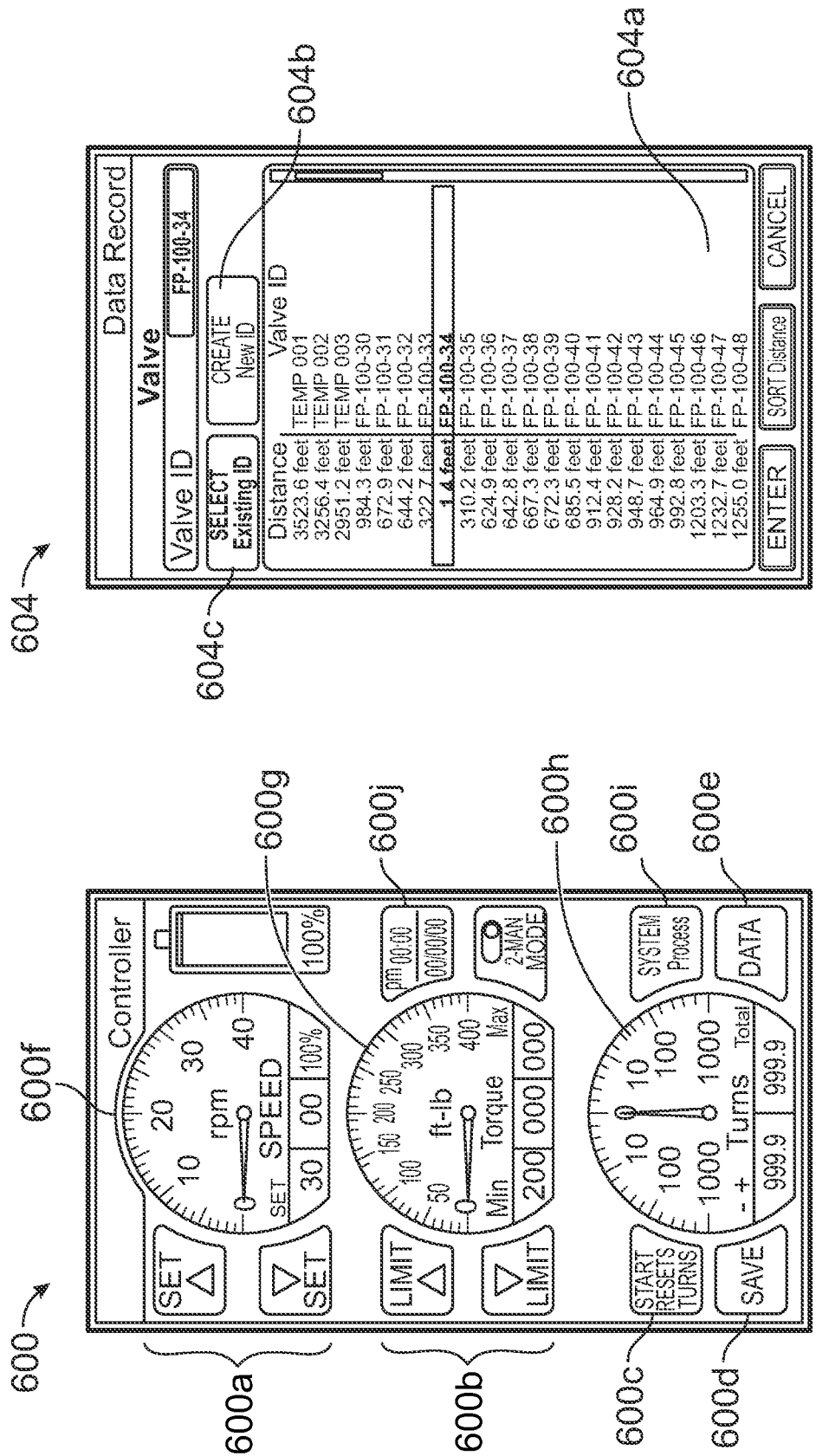
Figure 6B:
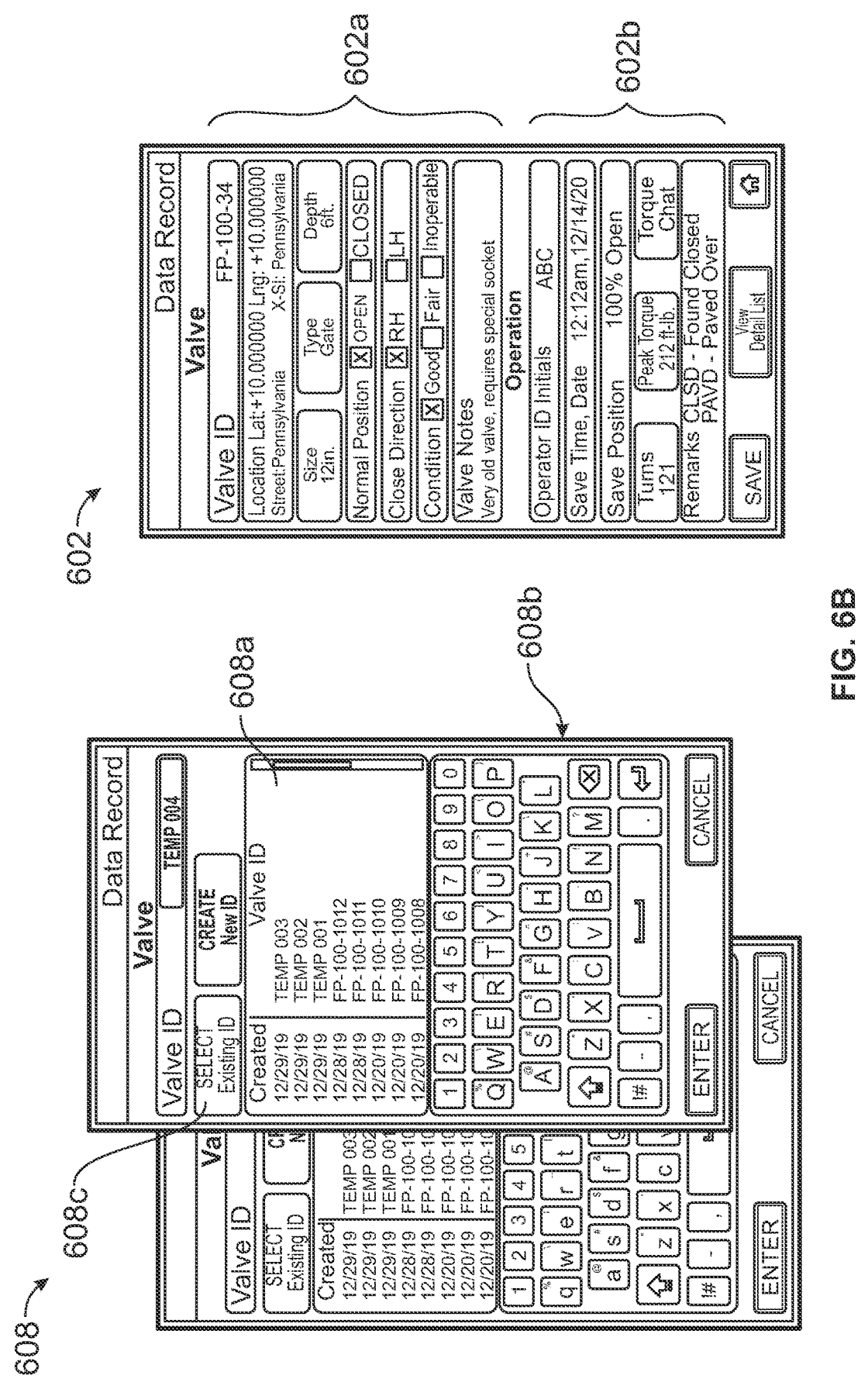
Figure 6C:
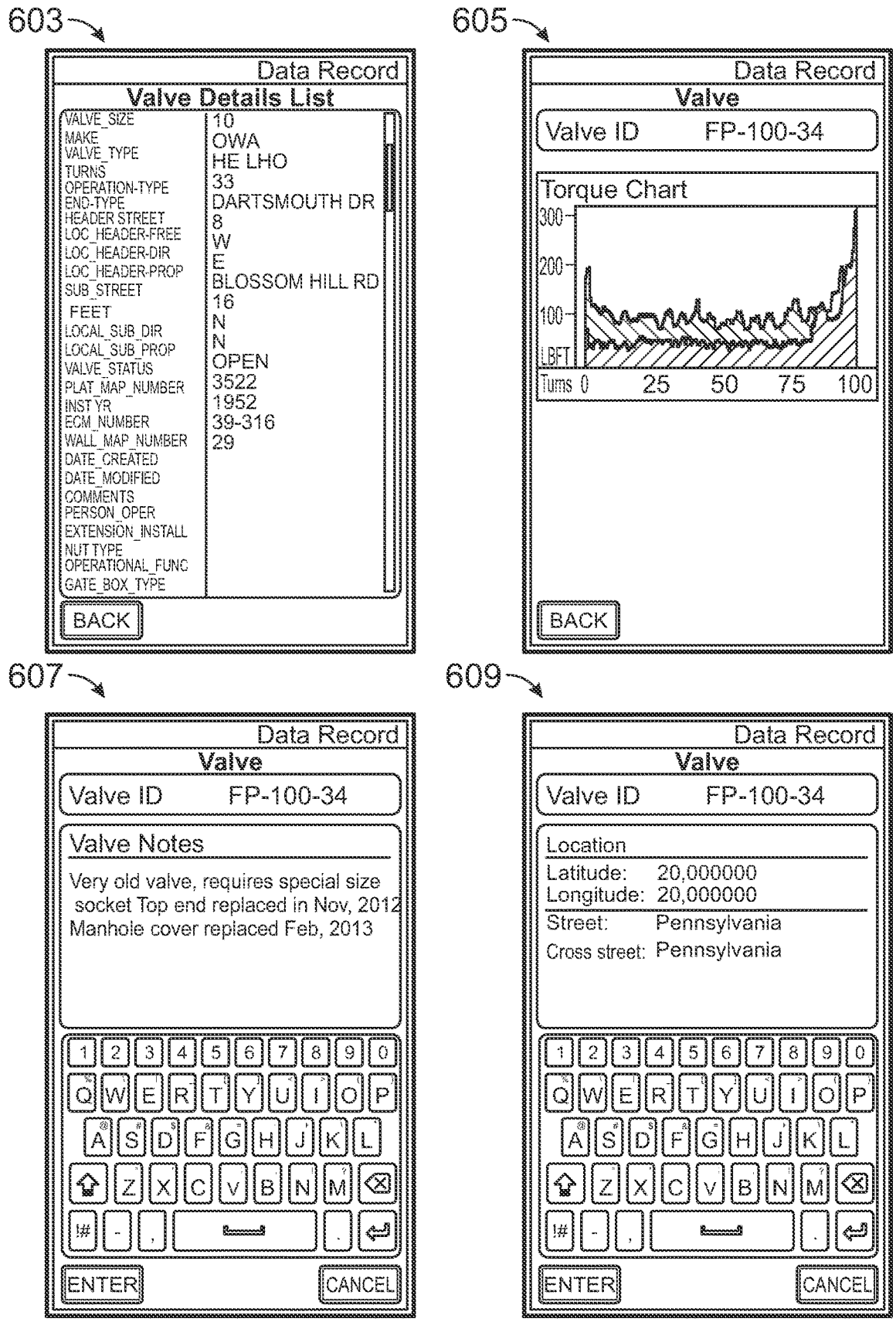
Figure 6D:
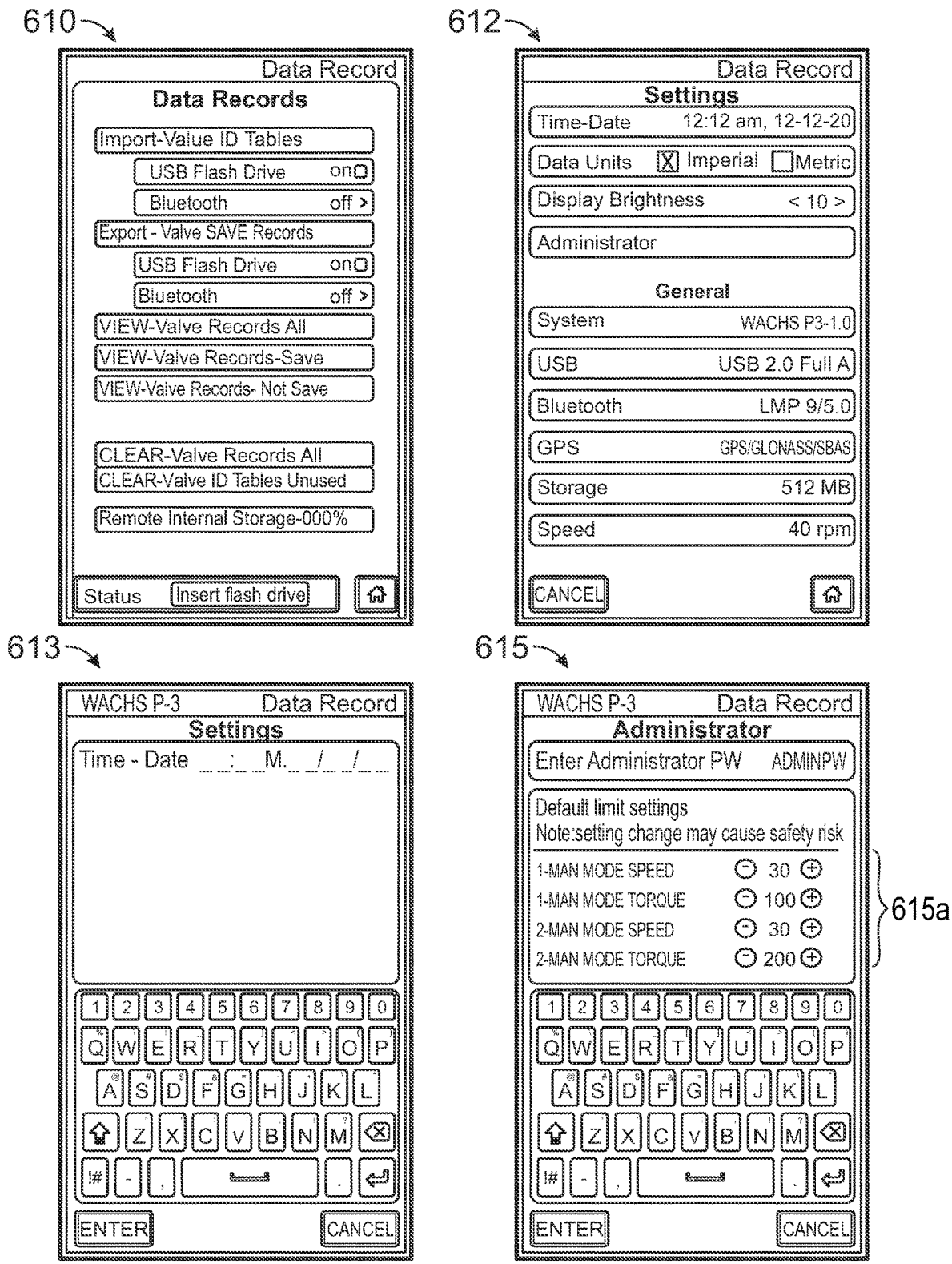

FIGS. 6A-6C illustrate examples of display screens displayed during operation of the example valve operating device 100. The display screens in FIGS. 6A and 6B include a home control screen 600, a valve data records screen 602, a valve identifier screen 604, and a valve record creation screen 608. FIG. 6C includes a valve detail list 603, a torque chart 605, a valve notes entry screen 607, and a valve location screen 609. FIG. 6D includes a data records screen 610, a system presets screen 612, a time-date settings screen 613, and an administrator settings screen 615. The display screens in FIGS. 6A-6D provide a human-machine interface for example implementations of the valve operating device 100.

The home control screen 600 is the main screen used for operating the device. In an example implementation, the home control screen includes a pair of set speed screen buttons (indicated as up and down arrows) 600a, a pair of set torque limit screen buttons (indicated as up and down arrows) 600b, a START (labels on buttons in examples illustrated in FIG. 6A are capitalized for clarity and not intended to be limiting) screen button 600c, a SAVE screen button 600d, a DATA screen button 600e, a speed indicator section 600f, a torque indicator section 600g, a turns indicator function 600h, and a SYSTEMS PRESET screen button 600i.

The pair of set speed screen buttons 600a may be used by the operator prior to exercising a valve to set the speed at which the motor operates. In an example implementation, set speed screen buttons 600a include an up arrow button and a down arrow button. Speed values may be provided as several fixed speed values, such as for example, speeds in increments of 10 from 10 rpm to 40 rpm. In another example, the speeds may be adjusted in increments of 2 rpm between 4 and 40 rpm. Other example implementations may use other increments with different ranges. The pressing of the UP arrow button sets the speed to the next faster speed. Pressing the down arrow button sets the speed to the next slower speed value.

The pair of set torque limit screen buttons 600b may be used by the operator prior to exercising a valve to set the maximum torque limit for the torque delivered by the motor. In an example implementation, set torque limit screen buttons 600b include an up arrow button and a down arrow button. Torque limit values may be provided as falling in a range of torque values, such as for example, torque values in ranges of 0-100, -200, - . . . , -700, -800 ft/lbs. The pressing of the UP arrow button sets the maximum torque limit upward. Pressing the down arrow button sets the maximum torque limit downward.

The START screen button 600c may be pressed to initiate an exercise protocol for a valve. Pressing the START screen button 600c resets the current torque value and turns value to 0. As the valve is exercised, the current torque value, maximum torque value, and turns value are measured (and displayed). The values of the current torque value, maximum torque value, and turns value are part of the valve operations data record for the exercise of the valve.

In an example implementation, a default speed and torque setting may be specified to provide guided control of the valve exercise operation. When the valve exercise protocol is started, the speed and torque increase from zero to the designated default speed and torque setting. Guided control may further specify that a constant horsepower be maintained through the valve exercise operation. Accordingly, as the valve exercise operation proceeds, if the speed changes, the torque level is adjusted to maintain a constant horsepower.

In an example implementation, the valve operating device 100 may be configured to permit attachment of an extension rod to enable operation in a two-man mode. The home control screen 600 may include a 2-man mode switch 600j to enable a two-man mode. In the two-man mode, the default speed and torque settings may be higher, twice as high, for example, than the default settings for a normal one-man operation. To illustrate, in one example implementation, the default speed/torque settings may be a speed of 30 rpm and a torque of 100 ft-lbs, where the horsepower is set to a constant of 0.54 hp. The two-man mode when the 2-man mode switch 600j is enabled, may specify a default speed of 30 rpm and a torque of 200 ft lbs, where the horsepower is set to a constant of 1.09 HP. Different settings for default speed and torque, as well as a constant horsepower may be set differently for different implementations for either the one-man or the two-man modes. In one example implementations, the default settings for the one-man mode and/or the two-man mode may be set by an administrator as described below with reference to the systems presets display 615 in FIG. 6C.

The operator can choose to save the valve operations data records as a result of the exercising of the valve, or the operator can decide that another test should be run. If the operator decides the latter, the operator presses the START screen button 600c to erase the results of the previous test.

In an example implementation, the SAVE screen button 600d may be selected to save the operations data records as data for a specific valve. In some implementations, when the operator presses the SAVE screen button 600d, the operator may be prompted by a screen (not shown) that requests an operator identifier. The prompt may be skipped if an operator identifier has previously been entered.

The valve identifier screen 604 may be displayed as part of the data save functions to identify a specific valve for which the valve operation data is to be stored. The valve identifier screen 604 provides the operator with existing valve identifiers from which to choose the valve for which an operation has been conducted. The valve identifier screen 604 also provides the operator with functions to create a new valve identifier if the operation has just been performed on a new valve.

The valve identifier screen 604 includes a valve list 604a, a create valve record button 604b, and a valve select screen button 604c. The valve list 604a lists each valve for which a valve record is entered. The valves may be listed by valve ID number, location, and date exercised. The valves in the valve list 604a may be selectable by pressing the valve identifier and pressing the valve select screen button 604c. The identifier data for any of the valves may be in memory on the device, on a USB drive, or on another computer. Pressing the valve select screen button 604c gathers the data by retrieving it from memory, whether it is on a USB drive or another computer via, for example, Bluetooth™. The operator may then press an enter screen button to select the valve for the valve exercise.

The create valve record button 604b may be used to create a valve record on-site. The operator presses the create valve record button 604b to display the valve record creation screen 608. The valve record creation screen 608 may include the valve list 608a, a keypad 608b, a select button 608c and a create button 608d. The operator may find that the desired valve record may already exist. If so, the operator may select the valve id in the valve list 608a and enter to select the valve. If the operator finds that a new valve record should be created, the keypad 608a is used to create a valve identifier. A location may be automatically provided by a GPS on the device 100. The date may also be automatically provided from the system date and time.

When a valve is selected from the valve identifier screen 604 or created from the create valve record screen 608, the valve identification data is displayed in the valve identifier section 602a of the valve data record screen 602. When the operator runs the valve exercise, the acquired operations records are associated with the valve identified in the valve identifier section 602a. It is possible for the operator to perform the valve exercise before obtaining the valve identification information. The valve operation data would then be associated with the valve selected by the user to be displayed in the valve identifier section 602a.

Once a valve identifier has been selected, or created, the valve operating device 100 displays the valve data records screen 602. The valve data records screen 602 may be divided into a valve identifier section 602a and a valve operation records section 602b. The valve identifier section 602a includes a form with data fields that contain identifying information about the valve being exercised. The type of information in the valve identifier section may include:

1. Valve identification number
2. Valve location (geographical)
3. Valve size
4. Valve type
5. Normal position (open or closed)
6. Direction to close (Right hand or Left hand)
7. Condition of the valve
8. Operator's notes The valve detail list 603 in FIG. 6B includes a list of information that may be presented to the operator to permit the operator to choose specific information to display to the operator.

Much of the data displayed in the valve identifier section 602a may already be stored for the valve identified. The valve identifier section 602a may also permit the operator to view or to modify certain data elements. For example, the valve operation records section 602b includes data measurements obtained from exercising the valve and information relating to the measurement. The data measurements include turns and torque. A torque chart may be displayed when a TORQUE CHART button is pressed to display certain torque values at times of interest during the exercise, such as at the start and end of the turns in either direction, for example, or at selected time intervals during the exercise. In one example, the torque, speed and turns measurements may be saved as a function of time during the exercise. The data may then be used to display a graph illustrating the values changing during the valve exercise.

The information relating to the measurements may include the operator ID, the date and time of the exercise, the position (Open or Close) in which the valve was left, and operation notes left by the operator. The operator may enter or modify valve notes using the valve notes screen 607. The operator ID may be displayed or modified using a button to drop a list of previously entered operator initials. The operation notes may be entered by selecting the data field to display a keypad and a data entry space as shown in screen 607. The location details of the valve may be displayed on the valve location screen 609.

The operator may save the valve operation data acquired for the valve by pressing the SAVE screen button on the valve data record screen 602. In an example implementation described below with reference to FIGS. 7 and 7A, a data save operation may only be permitted when valid data is entered in the valve ID, and location operator ID initials data field. The data in the data fields on the valve data record screen 602 may be verified when the SAVE screen button is pressed. The valve data record screen 602 may be maintained on the screen without saving data if a required field is not filled, or if a field is filled with invalid data. In some implementations, the fields may be checked for data without checking the validity of the data itself. When saved, the valve operation data would appear in the valve operation record section with the valve identification information in the valve identifier section when that valve is selected to appear in the valve data record screen 602. Pressing the START screen button 600c may erase the valve operation data for that valve and the operator can then run the valve exercise again.

The DATA screen button 600e displays the data records screen 610 when pressed by the operator. The data records screen 610 may be used by the operator to control what data is stored on the device 100 and to select data to view. The data records screen 610 also includes functions to clear memory. For example, the data records screen 610 may include a button to clear valve operation records (data acquired by exercising valves), valve identification records, or all records.

The data records screen 610 may include a function for importing valve records. A source may be selected, such as for example, USB drive, or Bluetooth™. A function may be provided to export valve operations records data. A destination may be selected, such as for example, a USB drive or Bluetooth™. The importing of valve records may be used to load the device with identifying data for valves that are to be exercised. The exporting of valve operations records data provides the results to a computer system that can perform further processing of the data.

The speed indicator section 600f of the home control screen 600 may display the current speed in real-time as a digital value or an analog display similar to a speedometer in an automobile, or both. The digital portion may display the speed of the turning valve as rpms and/or as a percentage of the maximum set speed. The maximum or set speed may be displayed for reference alongside the other digital values.

The torque indicator section 600g of the home control screen 600 may display the current torque applied to the valve in real-time as a digital value or an analog display or both. The torque may be displayed as a number of foot-lbs or a percentage of the maximum torque limit or both.

The turns indicator function 600h of the home control screen 600 may display the current number of turns traveled by the valve in real-time as a digital value or an analog display or both. The turns may be displayed digitally as a signed number to indicate direction, as a total number of turns, or both. The signed number may be used by the operator to determine the initial state of the valve as being closed, fully open, or partially open. For example, the operator may initiate a valve exercise and travel 80 turns on a valve that has a 100 turn range from close to open. The operator may have expected to proceed through 100 turns and reverse the direction of the motor to the other end of the range (open or close depending on the type of valve). The motor may travel 100 turns to close and end up with a value of −20 for a turn count. The operator may then determine that the valve was initially partially open by a fifth of fully open. The stopping of the valve at 80 turns would therefore be due to the valve being fully open rather than being obstructed.

The systems preset screen button 600i displays the systems preset data menu 612 when pressed. The system presets data menu 612 allows the operator to configure the device 100 by setting date and time (using a time and date settings screen 613), preferred data units (metric or English for example), display brightness, and characteristics relating to components that are part of the device 100, such as for example, USB, software version, Bluetooth, GPS module, and memory.

The systems preset screen 612 may also include an administrator selector to allow a privileged operator to modify default settings for speed and torque. When selected, the administrator function may present an administrator screen 615. The operator may be prompted for an administrator password, which when properly entered, allows the operator to make changes to default settings. The default settings may be listed in a selectable settings list 615a. The settings list 615*a* includes default speed and torque settings for a 1-man mode and default speed and torque settings for a 2-man mode. The display screen with the settings list 615*a* may include graphical user interface elements to enable the operator to change the values for each setting. The administrator screen 615 provides a way for an operator to modify the default speed and torque settings and other settings that may be deemed to require secure access to enable modification. Default speed and torque settings may affect the safety of the valve operating device 100 making it advantageous to require a secure access.

FIGS. 7A-7C, and 8-9 are flowcharts illustrating user interface operation of the example valve operating device 100 (in FIG. 1). Any reference to the device in the description of the flowcharts in FIGS. 7A-7C, and 8-9 shall be to the valve operating device 100 in FIG. 1 unless otherwise indicated. The flowcharts in FIGS. 7A-7C, and 8-9 illustrate operation of the device 100 in the context of its use by an operator.

Figure 7A:
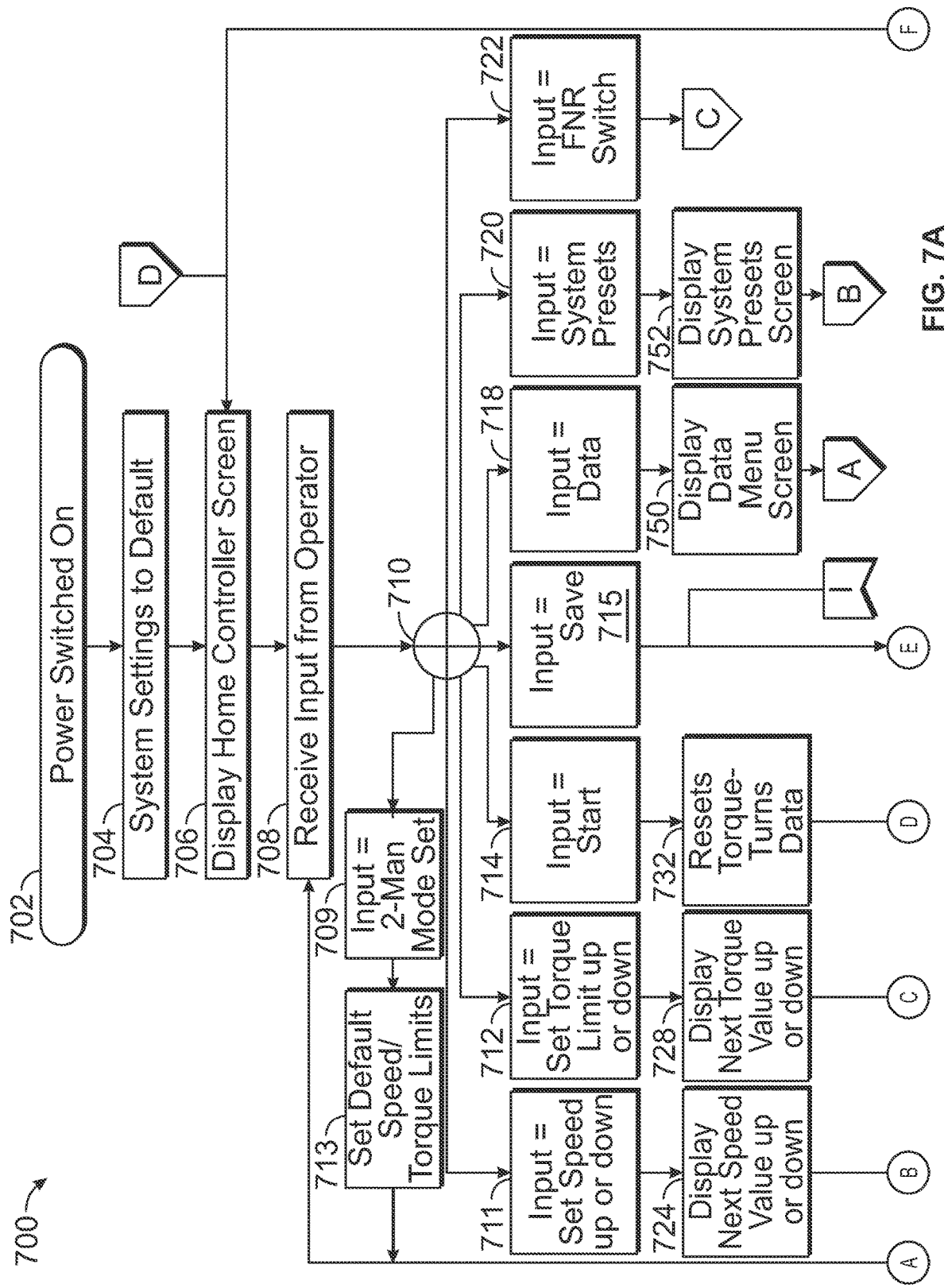
FIGS. 7A-7C, and 8-9 are flowcharts illustrating user interface operation of the example valve operating device.
Figure 7B:
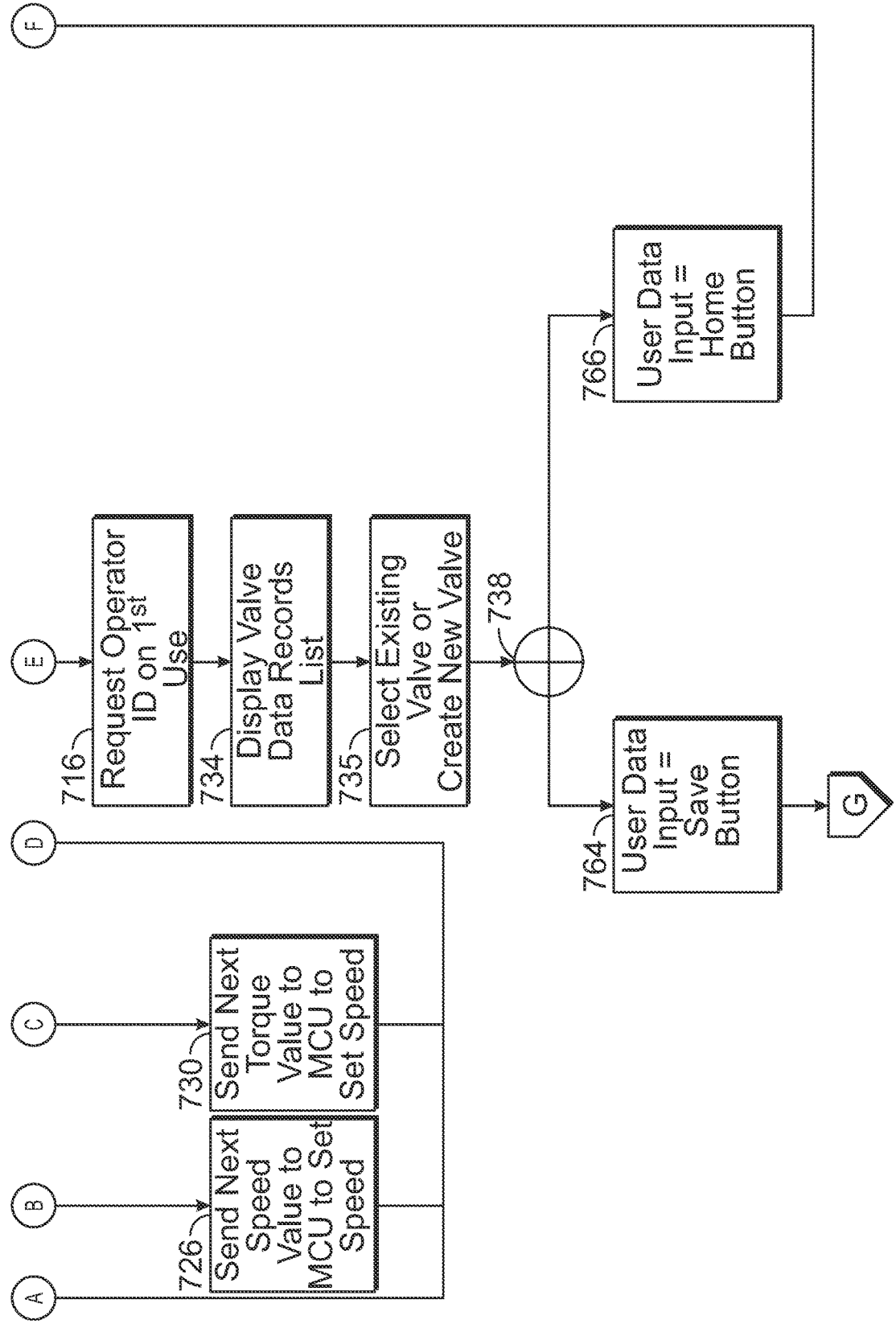
Figure 7C:
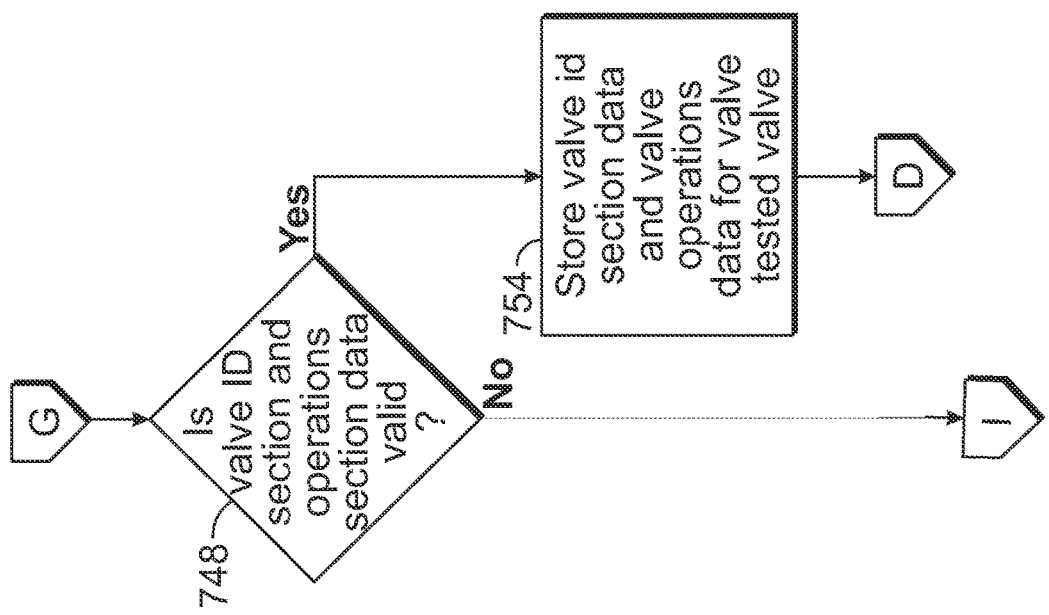

The flowchart 700 in FIGS. 7A-7C illustrates operation of the device 100 starting with turning on the power to the device at step 702. At power-up, the system settings of the device are set to a default state at step 704. The default settings may be involve clearing the memory of data records, default system presets or the last modified system presets, or to an predetermined automatic state. At step 706, the home control screen is displayed on the display device. The system software may then wait for a user input. At step 708, user input is received from the operator. The user input may be one of several user inputs available on the home control screen as indicated by the OR operator 710.

When the operator presses the 2-man mode button 709, an indicator may be set to indicate that the valve operating device 100 is in either the 2-man mode or the 1-man mode. The indicator may be a light source, integrated with the button so that pressing the button controls the state of the indicator. The 2-man mode button 709 may be a toggle switch that enables the 2-man mode when the 1-man mode is set, or the 1-man mode when the 2-man mode is set. When a transition to the 2-man mode from the 1-man mode is triggered, the default settings for speed and torque are set to default settings for the 1-man mode. When a transition to the 1-man mode from the 2-man mode is triggered, the default settings for speed and torque are set to default settings for the 2-man mode. Default settings may be hardwired, or stored in memory in manner that makes it modifiable. In one example, the human-machine interface of the valve operating device 100 may be configured to enable a user to adjust the default settings. The description of the administrator screen 615 in FIG. 6D above illustrates one way in which the default speed and torque settings may be modified.

The user input at step 711 may be either the set speed up or down arrows. The speed up or speed down arrows may typically be pressed while the valve operating device 100 is in operation. At step 724, the speed selected is set to and displayed as the next speed up or down depending on the arrow pressed. At step 726 in FIG. 7B, the speed setting is provided to the motor controller unit to drive the motor at the selected speed. Control returns to step 708 after each press of the arrow up or arrow down keys.

At step 712, the user pressed the torque limit up or down arrows. The torque adjustment arrows may be pressed by the operator during operation of the valve operating device 100. At step 728, the next torque level up or down, depending on the arrow pressed is set to and displayed as the maximum limit of torque to be generated by the motor in the next operation of the motor. At step 730 in FIG. 7B, the set torque is provided to the motor controller unit to limit the torque applied during the next operation of the motor. Control returns to step 708 after each press of the arrow up or arrow down keys.

It is noted that during an adjustment of speed by the operator during operation the valve operating device 100, the torque may need to be automatically adjusted to keep the horsepower constant. Similarly, an adjustment of torque by the operator during operation the valve operating device 100, the speed may need to be automatically adjusted, also to keep the horsepower constant. The adjustment of the speed or torque may be performed by software as described with reference to FIG. 9 below using the well-known horsepower relationship:

$$HP=\text{Speed (rpm)} \times \text{Torque (ft-lb)}/5252.$$

At step 714, the user pressed the START screen button on the home control screen. At step 732, the valve operations record, or the data that was most recently acquired by running the valve exercise are reset to an initial value (typically zero, depending on the parameter). Control then returns to step 708.

At step 715, the user pressed the SAVE screen button on the home control screen. At step 716 in FIG. 7B, the human machine interface of the valve operating device 100 may request the operator to enter an operator identifier. This step may be skipped if an operator identifier has previously been entered. The valve identifiers screen 604 (in FIG. 6A) may then be displayed at step 734 to allow the operator to select or create a valve identifier. The operator may either select an existing valve identifier or create a new one. The display may then transition to the valve data records screen 602 as described above with reference to the screens in FIGS. 6A and 6B.

The valve data records screen 602 provides the operator with a display of the operations data from the last valve exercise performed and information about the valve itself. The display may permit the operator to add data or modify data as described above with reference to FIGS. 6A-6D.

As indicated by OR operator 738, the user input received from the valve data records screen may also be from the valve data record screen SAVE button at 764, or a valve data record screen HOME button at 766. The operator may wish to repeat the test upon viewing the operations data displayed in the valve operations section 602*b* (FIG. 6B). The operator may then wish to repeat the valve exercise. The operator may press the HOME screen button in the valve data records screen to go back to the home screen without saving data.

If however, the operator decides the operations data from the most recent valve exercise should be saved, the user input at OR operator 738 may be a press of the SAVE screen button at step 764. At decision block 748 in FIG. 7A, the data in the valve ID section and in the valve operations section may be checked to determine if the data is present in the data fields. If certain data in either section is not present or not valid (NO path), the valve data records screen is maintained on the display waiting for user input. In an example implementation, the system may require that any or all of an operator ID, a valve ID, a valve location, or a date and time be entered. In one implementation, an error popup message may be displayed if any data is missing. The data may also be checked for validity based on any suitable standard of validity for the data entered in the valve ID section.

If at decision block 748, the data in the valve ID section and the valve operations section is valid, or at least present, the valve id section data and the valve operations section data is stored for later analysis at step 754. When the data in the valve data records screen is saved, control may return to the home control screen at step 706.

Figure 8:
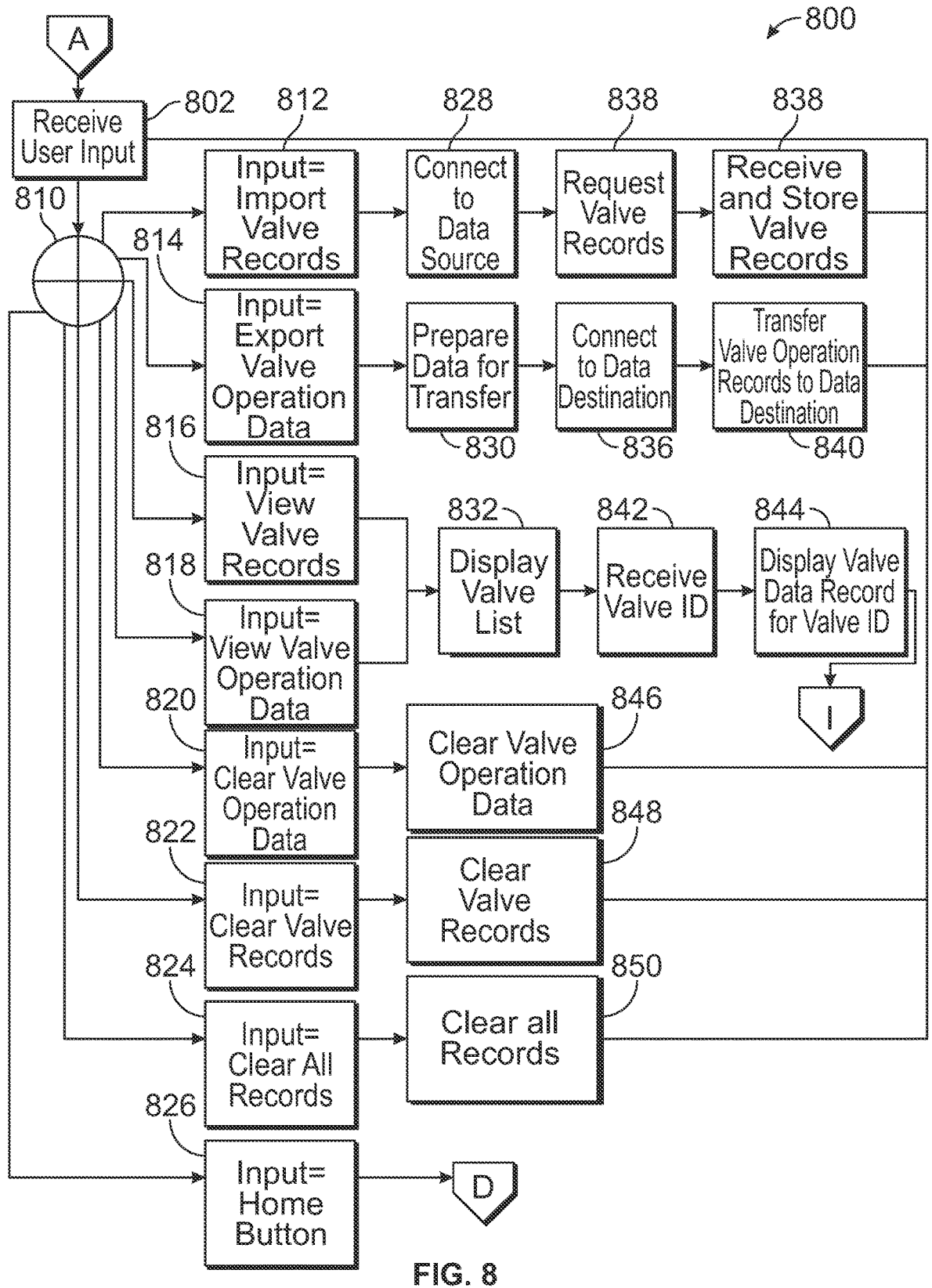

At the home control screen, the user may press the DATA screen button at step 718. At step 750, the data menu screen 610 (in FIG. 6D) is displayed on the display device. Referring to FIG. 8, the system software waits for user input at step 802. Multiple user inputs may be received at step 802 as indicated by the OR function 810. At step 812, the user input is a press of the import valve records button (see 610 FIG. 6D). At step 828, a data connection is made to the selected source for importing the data. The data source in one example implementation may be a USB connection, which may have a USB drive or a USB cable connection to another device. The selected source may be another device connected by Bluetooth. At step 834, a communications protocol may be performed to request valve records from the source. At step 838, the valve records are received and stored. Control then returns to step 802.

At step 814, the user input was the press of the export valve operations data, which may include both valve operation records data acquired during a valve exercise and valve identification data. At step 830, the data is prepared for transfer. At step 836, a data connection is made to the selected destination, which again, in an example implementation may be a USB connection or a Bluetooth connection. At step 840, the vehicle operations data is transferred to the selected destination. Control then returns to step 802, At step 816, the user input a press of the view valve records button and at step 818, the user input a press of the view valve operations data button. At step 832, either the valve identifier data or the valve operations data or both may be displayed using the valve identifier screen. At step 842, the user input for the valve identifier section is received. At step 844, the valve data record screen for the selected valve identifier is displayed. Control then proceeds to decision block 734 to process the user inputs at the valve data record screen.

At step 820, the user input a press of the clear valve operations data button. At step 846, the valve operations data, which is the data acquired during valve exercise, is cleared from memory. Control then returns to step 802.

At step 822, the user input a press of the clear valve records button. At step 848, the valve data, which may include the valve identifier data, as well as data acquired during valve exercise, is cleared from memory. Control then returns to step 802.

At step 824, the user input a press of the clear all records button. At step 850, all valve records data is cleared from memory. Control then returns to step 802.

At step 826, the user input is the press of the home button. Control then returns to step 708 in FIG. 7.

Figure 9:
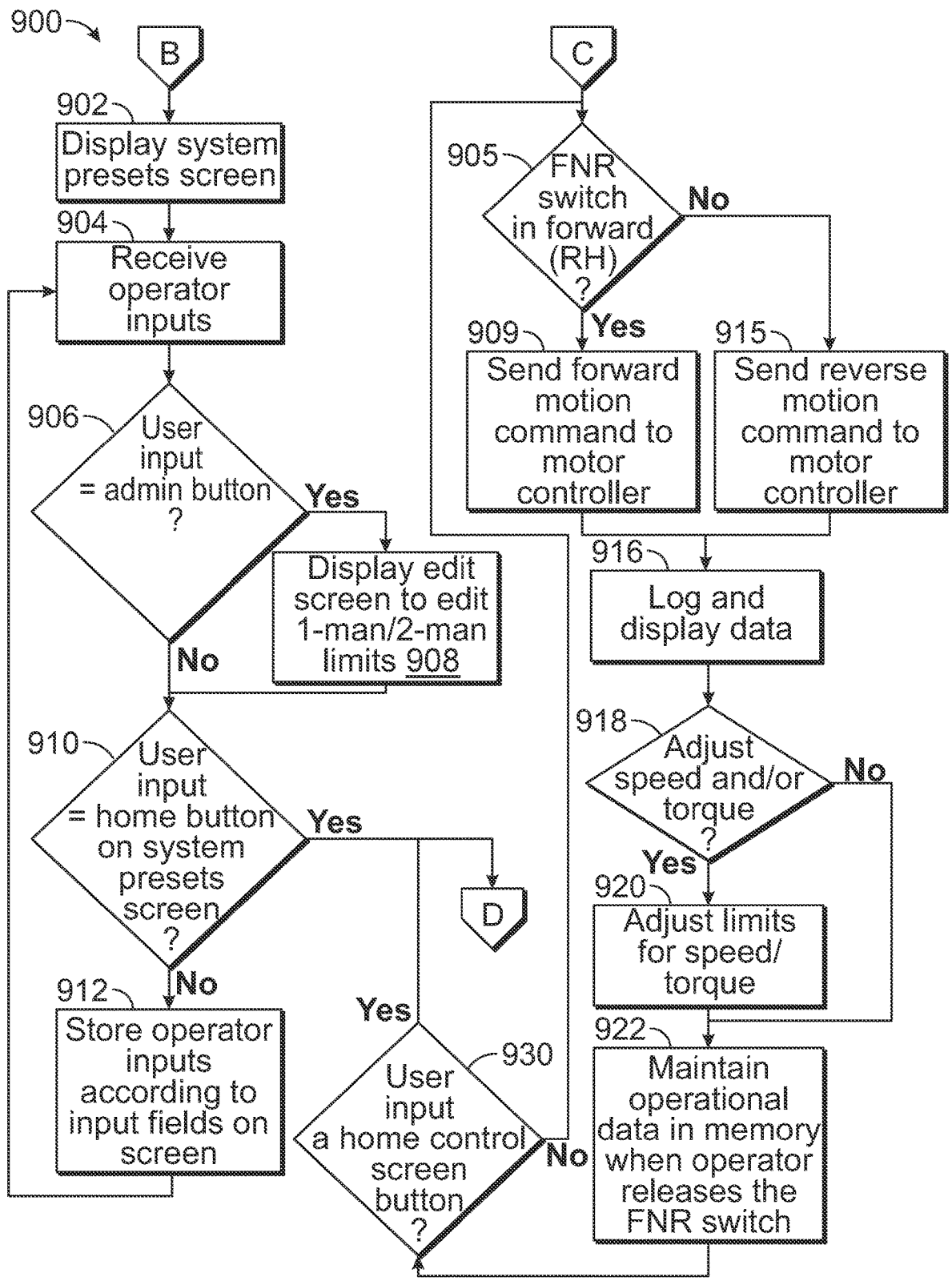

Referring back to FIG. 7, at step 720, the user pressed the system presets button. Referring to FIG. 9, at step 902, the system presets screen is displayed (see 612 in FIG. 6D). At step 904, a user input is received. Decision block 906 determines if the operator pressed the administrator button of the system presets screen 612 (in FIG. 6D). If the administrator button is pressed, the administrator settings screen 615 (in FIG. 6D) may be displayed. At step 908, the operator may edit default settings for the 1-man mode and/or the 2-man mode. The default settings may be provided for speed and torque. Other settings may be provided. The operator may press SAVE in the administrators settings screen 615 (in FIG. 6D) too return to the system presets screen 612 (in FIG. 6D). It is noted that other data in the system presets screen 612 may be modified.

Decision block 910 determines if the user input is the press of the home button on the system presets screen. If the user pressed the home button (YES' path), control returns to step 708 in FIG. 7. If the user entered data relating to the displayed system presets ('NO' path), the operator inputs are stored according to the input fields in which data was added at step 908. For example, the user input in the system presets screen may relate to setting date and time, preferred data units (metric or English for example), display brightness, and characteristics relating to components that are part of the device 100, such as for example, USB, software version, Bluetooth, GPS module, and memory. Control then returns to step 904.

Returning to FIG. 7, at step 722, the user input was the pressing and holding until the operator lets go of the FNR switch. Referring to FIG. 9, decision block 905 checks if the forward direction was pressed on the FNR switch. If the forward direction was pressed (YES' path), the motor controller unit is commanded to drive the motor in the forward direction at step 909. If the reverse direction was pressed (NO' path of decision block 905), the motor controller unit is commanded to drive the motor in the reverse direction at step 915.

At step 916, as the motor is moving, the turns are counted and displayed on the turn indicator display on the home control screen. The turn count may be displayed as a signed number to indicate direction or as a total number, or both. The turn count may also be indicated using an analog display format. The torque and torque as a percentage of max torque limit may be displayed on the torque indicator display on the home control screen. The speed and speed as a percentage of maximum set speed may be displayed on the speed indicator display on the home control screen. It is noted that step 916 may be performed continuously as long as the motor is moving. It is further noted that the operator may release the FNR switch in one direction and press the FNR switch to move the motor in the opposite direction. This may occur for example, if the valve resists due to deposits or dirt or rust that has accumulated over time. The operator may reverse the motor for a short period of time, then reverse the direction of the motor again to free the valve. Each time the motor stops, for example, when the operator releases the FNR switch, the operational record data, which includes at least the speed, torque and turn parameters described with respect to step 916, may be logged, or maintained in memory to indicate the result of the test until the operator has concluded the valve exercise.

At decision block 918, the operator may have pressed a speed or torque control input (at steps 711 and 712 in FIG. 7A). If the operator has adjusted speed or torque, decision block 918 determines that speed or torque is to be adjusted to maintain a constant horsepower at step 920. At step 922, operational data is maintained and constantly updated in memory as the valves are exercised, and then stored in memory when the operator has released the FNR switch. If the operator has not pressed another screen button but rather is continuing to exercise the valve in an opposite direction, control returns to decision block 910. If decision block 930 determines that the operator has pressed another screen button on the home control screen, control returns to step 708 in FIG. 7A.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A valve operating device comprising:
    a base defining a central axis extending from a first end thereof to a second end thereof;
    a housing on the base;
    a motor disposed within the housing, the motor having a motor output shaft configured to drive a planetary gearbox disposed within the housing, the planetary gearbox configured to rotate a key extending substantially perpendicular to the central axis to engage a valve;
    a motor controller unit configured to drive the motor in either a forward or reverse direction at a set motor speed to deliver up to a torque limit;
    a user interface comprising a motor activation switch and a display device configured to provide a graphical user interface comprising screen images including display buttons, wherein the user interface is configured to display a save button, and, in response to detecting a press of the save button, saving valve operation data acquired for the valve, verifying that data for a valve identification for the valve is valid, and storing data for the valve identification of the valve; and
    a human machine interface controller configured to receive user inputs via the display buttons and the motor activation switch, and to perform valve exercise functions corresponding to the display buttons, the valve exercise functions including setting a motor speed, setting a torque limit, turning the motor on or off, and storing valve operation data.

2. The valve operating device of claim 1, further comprising a data network interface configured to communicate valve configuration data and valve operation data with a remote computing device.

3. The valve operating device of claim 2, wherein the data network interface includes a wired communications interface.

4. The valve operating device of claim 3, wherein the wired communications interface includes a Universal Serial Bus (USB) interface.

5. The valve operating device of claim 3, wherein the wired communications interface is configured to receive a storage device.

6. The valve operating device of claim 2, wherein the data network interface includes a wireless communications interface.

7. The valve operating device of claim 6, wherein the wireless communications interface includes a Bluetooth™ interface.

8. The valve operating device of claim 1, wherein the screen images include a home control screen configured to provide user interface components to initiate valve exercise functions and view valve operations records data as the valve is exercised.

9. The valve operating device of claim 8, wherein the home control screen includes a speed display section to indicate a current speed, a torque display section to display a current torque, and a turns display section to display a current number of turns of the motor as the valve is exercised.

10. The valve operating device of claim 9, wherein at least one of the speed display section, the torque display section, and the turns display section comprises an analog indicator and a digital indicator.

11. The valve operating device of claim 8, wherein the home control screen further comprises a start screen button configured to reset valve operation data records when pressed by the operator.

12. The valve operating device of claim 8, wherein the home control screen is further configured to display a valve data record screen comprising valve identifier section comprising a plurality of fields comprising valve identification data for a previously selected valve identifier, the valve identifier section comprising a valve identifier entry form for entry of valve data by the operator, the valve data record screen further comprising a valve operation record section configured to display valve operation data recorded in a last exercising of the valve.

13. The valve operating device of claim 12, wherein the valve data record screen comprises a valve identifier screen button configured to display, when pressed by the operator, a valve identifier screen comprising a valve list comprising a list of valve identifiers corresponding to valves in a geographical area have been or are to be exercised.

14. The valve operating device of claim 13, wherein the valve list includes a valve data entry screen button configured to display a plurality of valve data records corresponding to a listed valve selected by the operator, where the valve data records are displayed in the valve identifier section of the valve data record screen when the operator selects the valve data entry screen button.

15. The valve operating device of claim 8, wherein the home control screen includes a data screen button configured to display, when pressed by the operator, a data records screen comprising a valve record import function configured to import data relating to at least one valve via the data network interface, where the valve data records corresponding to the at least one valve is stored in a valve list in a storage device on the valve operating device.

16. A method for exercising a valve comprising:
    resetting a valve operations data record when an operator presses a start data screen button on a display device disposed on a valve operating device coupled to a valve opening and closing mechanism on a valve;
    driving a motor in a forward direction at a set speed up to a torque less than or equal to a torque limit when the operator presses a forward button on the valve operating device or in a reverse direction at the set speed up to a torque less than or equal to the torque limit when the operator presses a reverse button on the valve operating device;
    displaying a current speed, a current torque, and a turn count on the display device as the motor turns the valve opening and closing mechanism;
    displaying a save button on a user interface, and, in response to detecting a press of the save button, verifying that data for a valve identification for valve is valid, and storing data for the valve identification of the tested valve; and
    maintaining a valve operations records comprising a turn count and a maximum torque measured during the step of driving the motor.

17. The method of claim 16, further comprising displaying a valve data record screen on a home control screen on the display device, the valve data record screen comprising a valve identifier section comprising a plurality of fields comprising valve identification data for a previously selected valve identifier, the valve identifier section comprising a valve identifier entry form for entry of valve data by the operator, the valve data record screen further comprising a valve operation record section configured to display valve operation data recorded in a last exercising of the valve.

18. The method of claim 17, wherein the valve data record screen includes a valve identifier screen button, the method further comprising displaying a valve identifier screen button configured to display, when pressed by the operator, a valve list comprising a list of valve identifiers corresponding to valves in a geographical area have been or are to be exercised.

19. The method of claim 18, wherein the valve list includes a valve data entry screen button, the method further comprising displaying, when the valve data entry screen button is pressed by the operator, a plurality of valve data records corresponding to a listed valve selected by the operator, where the valve data records are displayed in the valve identifier section of the valve data record screen when the operator selects the valve data entry screen button.

20. The method of claim 16, further comprising displaying, when the user presses a data screen button on a home control screen, a data records screen comprising a valve record import function configured to import data relating to at least one valve via the data network interface, where the valve data records corresponding to the at least one valve is stored in a valve list in a storage device on the valve operating device.

21. The method of claim 16, wherein the step of maintaining valve operations records includes storing a series of any of a set of torque values, speed values, and turn values as a function of time to enable later display of a graph.

22. The method of claim 16, wherein the step of driving the motor comprises:

driving the motor in either the forward or reverse direction at the set speed, where the set speed is a default speed and the torque is a default torque, where the default speed and the default torque define a constant horsepower; and adjusting the set speed to another speed when the torque changes to maintain the constant horsepower.

23. The method of claim 16, wherein the step of driving the motor comprises:

driving the motor in either the forward or reverse direction at the set speed, where the set speed is a default speed and the torque is a default torque, where the default speed and the default torque define a constant horsepower; and adjusting the torque to another torque when the speed changes to maintain the constant horsepower.

* * * * *